United States Patent
Yang et al.

(10) Patent No.: US 12,159,167 B2
(45) Date of Patent: Dec. 3, 2024

(54) METHOD, SYSTEM, AND COMPUTER PROGRAM PRODUCT FOR DYNAMICALLY ASSIGNING AN INFERENCE REQUEST TO A CPU OR GPU

(71) Applicant: Visa International Service Association, San Francisco, CA (US)

(72) Inventors: Hao Yang, San Jose, CA (US); Biswajit Das, Foster City, CA (US); Yu Gu, Austin, TX (US); Peter Walker, Cedar Park, TX (US); Igor Karpenko, Dublin, CA (US); Robert Brian Christensen, Saratoga Springs, UT (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 18/215,921

(22) Filed: Jun. 29, 2023

(65) Prior Publication Data

US 2023/0342203 A1   Oct. 26, 2023

Related U.S. Application Data

(63) Continuation of application No. 16/750,100, filed on Jan. 23, 2020, now Pat. No. 11,714,681.

(51) Int. Cl.
*G06F 9/50* (2006.01)
*G06F 9/38* (2018.01)
(Continued)

(52) U.S. Cl.
CPC .......... *G06F 9/5005* (2013.01); *G06F 9/5027* (2013.01); *G06F 9/5044* (2013.01);
(Continued)

(58) Field of Classification Search
None
See application file for complete search history.

(56) References Cited

U.S. PATENT DOCUMENTS

| 10,417,350 B1 | 9/2019 | Mohamed et al. |
| 10,805,179 B2 | 10/2020 | Guim Bernat et al. |

(Continued)

OTHER PUBLICATIONS

Van Winkle, "Dynamic Bandwidth and Laser Scaling for CPU-GPU Heterogenous Network-on-Chip Architectures", Russ College of Engineering and Technology of Ohio University, 2017, 89 pages.

(Continued)

*Primary Examiner* — Qing Yuan Wu
(74) *Attorney, Agent, or Firm* — The Webb Law Firm (57) ABSTRACT

A method for dynamically assigning an inference request is disclosed. A method for dynamically assigning an inference request may include determining at least one model to process an inference request on a plurality of computing platforms, the plurality of computing platforms including at least one Central Processing Unit (CPU) and at least one Graphics Processing Unit (GPU), obtaining, with at least one processor, profile information of the at least one model, the profile information including measured characteristics of the at least one model, dynamically determining a selected computing platform from between the at least one CPU and the at least one GPU for responding to the inference request based on an optimized objective associated with a status of the computing platform and the profile information, and routing, with at least one processor, the inference request to the selected computing platform. A system and computer program product are also disclosed.

20 Claims, 4 Drawing Sheets

(51) Int. Cl.
*G06N 5/04* (2023.01)
*G06T 1/20* (2006.01)

(52) U.S. Cl.
CPC .......... *G06F 9/5055* (2013.01); *G06F 9/5088* (2013.01); *G06F 9/3836* (2013.01); *G06F 9/3877* (2013.01); *G06N 5/04* (2013.01); *G06T 1/20* (2013.01)

(56) References Cited

U.S. PATENT DOCUMENTS

2018/0341525 A1 11/2018 Gupta et al.
2019/0156247 A1 5/2019 Faulhaber, Jr. et al.

OTHER PUBLICATIONS

Wang et al., "Improving CPU and GPU Performance through Sample-Based Dynamic LLC Bypassing", Journal of Computing Science and Engineering, 2018, vol. 12:2, pp. 50-62.

METHOD, SYSTEM, AND COMPUTER PROGRAM PRODUCT FOR DYNAMICALLY ASSIGNING AN INFERENCE REQUEST TO A CPU OR GPU

CROSS-REFERENCE TO RELATED APPLICATION

This application is a continuation of U.S. patent application Ser. No. 16/750,100, filed Jan. 23, 2020, the disclosure of which is hereby incorporated by reference in its entirety.

BACKGROUND

1. Field

This disclosed subject matter relates generally to methods, systems, and computer program products for dynamically assigning incoming inference requests to processing-bound inference engines and, in some non-limiting embodiments or aspects, to a method, system, and computer program product for dynamically and/or statically assigning incoming inference requests for model execution to processors or other hardware devices.

2. Technical Considerations

Machine learning applications (e.g., deep learning, artificial intelligence, neural networks, etc.) are rapidly increasing along with the number of new models and advancements in computational power. As the practical applications of the technology multiply, many organizations are developing their own machine learning applications to solve complicated business and scientific problems. For example, machine learning applications are used to generate and provide mission critical financial information, such as fraud detection for real-time credit card transactions or spend management for at least one entity (e.g., a transaction service provider, an issuer, a customer, a merchant, an acquirer, and/or the like). Such applications may also be purposed to review records or information (e.g., for verification, segmentation, security review, customer support, auditing, record keeping, and/or the like).

However, machine learning applications remain computationally intensive and performance optimization has mainly focused on accelerating the training of models, with increases in the volumes of training data used to improve accuracy, acquisition of relevant data for modeling, transformations for multi-faceted modeling of machine learning problems, and comprehensive calculations to rescale data. Accelerators, such as GPUs, are available to speed up algorithms, but machine learning workloads continue to increase despite specialized hardware units that are developed or adapted to accelerate such tasks.

SUMMARY

Accordingly, it is an object of the presently disclosed subject matter to provide methods, systems, and computer program products for dynamically determining a selected computing platform for processing an inference request.

According to some non-limiting embodiments or aspects, provided is a computer-implemented method, comprising: determining, with at least one processor based on an inference request, at least one model to process the inference request on a plurality of computing platforms, the plurality of computing platforms including at least one Central Processing Unit (CPU) and at least one Graphics Processing Unit (GPU); obtaining, with at least one processor, profile information of the at least one model, the profile information including measured characteristics of the at least one model; dynamically determining, with at least one processor, a selected computing platform from between the at least one CPU and the at least one GPU for responding to the inference request based on an optimized objective associated with a status of the computing platform and the profile information; and routing, with at least one processor, the inference request to the selected computing platform.

According to some non-limiting embodiments or aspects, provided is a system, comprising at least one processor programmed or configured to: determine, based on an inference request, at least one model to process the inference request on a plurality of computing platforms, the plurality of computing platforms including at least one Central Processing Unit (CPU) and at least one Graphics Processing Unit (GPU); obtain profile information of the at least one model, the profile information including measured characteristics of the at least one model; dynamically determine a selected computing platform from between the at least one CPU and the at least one GPU for responding to the inference request based on an optimized objective associated with a status of the computing platform and the profile information; and route the inference request to the selected computing platform.

According to some non-limiting embodiments or aspects, provided is a computer program product, comprising at least one non-transitory computer-readable medium including program instructions that, when executed by at least one processor, cause the at least one processor to: determine, based on an inference request, at least one model to process the inference request on a plurality of computing platforms, the plurality of computing platforms including at least one Central Processing Unit (CPU) and at least one Graphics Processing Unit (GPU); obtain profile information of the at least one model, the profile information including measured characteristics of the at least one model; dynamically determine a selected computing platform from between the at least one CPU and the at least one GPU for responding to the inference request based on an optimized objective associated with a status of the computing platform and the profile information; and route the inference request to the selected computing platform.

Further embodiments or aspects are set forth in the following clauses:

Clause 1: A computer-implemented method, comprising: determining, with at least one processor based on an inference request, at least one model to process the inference request on a plurality of computing platforms, the plurality of computing platforms including at least one Central Processing Unit (CPU) and at least one Graphics Processing Unit (GPU); obtaining, with at least one processor, profile information of the at least one model, the profile information including measured characteristics of the at least one model; dynamically determining, with at least one processor, a selected computing platform from between the at least one CPU and the at least one GPU for responding to the inference request based on an optimized objective associated with a status of the computing platform and the profile information; and routing, with at least one processor, the inference request to the selected computing platform.

Clause 2: The method of clause 1, further comprising determining the optimized objective by balancing throughput associated with processing the at least one model based on at least one of the following: a latency target, a power budget, a server node count, or any combination thereof.

Clause 3: The method of clauses 1 or 2, wherein the profile information is obtained based on the at least one model and comprises a runtime deployment model trained for at least one of the plurality of computing platforms.

Clause 4: The method of any of clauses 1-3, wherein the measured characteristics of the at least one model comprise at least one of the following: a throughput, a size, a power efficiency, an accuracy level, a model type, or any combination thereof.

Clause 5: The method of any of clauses 1-4, wherein the at least one GPU is configured in a blocking state until a job size is maximized to start inferences.

Clause 6: The method of any of clauses 1-5, wherein the status of the computing platform is determined based on at least one of the following: CPU utilization, GPU utilization, RAM utilization, inference throughput, number of jobs, latency data, historical completion data, CPU type, GPU type, a size of the at least one model, a memory footprint of the at least one model, or any combination thereof.

Clause 7: The method of any of clauses 1-6, further comprising at least one of: sending the inference request to the at least one CPU if a throughput is less than a threshold; sending the inference request to the at least one GPU if the at least one GPU is accumulating inference jobs and the inference request can fit into a batch based on the measured characteristics; sending the inference request to the at least one CPU if the at least one GPU is unavailable to process the at least one model; or creating a new job for the at least one GPU.

Clause 8: A system, comprising: at least one processor programmed or configured to: determine, based on an inference request, at least one model to process the inference request on a plurality of computing platforms, the plurality of computing platforms including at least one Central Processing Unit (CPU) and at least one Graphics Processing Unit (GPU); obtain profile information of the at least one model, the profile information including measured characteristics of the at least one model; dynamically determine a selected computing platform from between the at least one CPU and the at least one GPU for responding to the inference request based on an optimized objective associated with a status of the computing platform and the profile information; and route the inference request to the selected computing platform.

Clause 9: The system of clause 8, wherein the at least one processor is further programmed or configured to determine the optimized objective by balancing throughput associated with processing the at least one model based on at least one of the following: a latency target, a power budget, a server node count, or any combination thereof.

Clause 10: The system of clauses 8 or 9, wherein the profile information is obtained based on the at least one model and comprises a runtime deployment model trained for at least one of the plurality of computing platforms.

Clause 11: The system of any of clauses 8-10, wherein the measured characteristics of the at least one model comprise at least one of the following: a throughput, a size, a power efficiency, an accuracy level, a model type, or any combination thereof.

Clause 12: The system of any of clauses 8-11, wherein the at least one GPU is configured in a blocking state until a job size is maximized to start inferences.

Clause 13: The system of any of clauses 8-12, wherein the status of the computing platform is determined based on at least one of the following: CPU utilization, GPU utilization, RAM utilization, inference throughput, number of jobs, latency data, historical completion data, CPU type, GPU type, a size of the at least one model, a memory footprint of the at least one model, or any combination thereof.

Clause 14: The system of any of clauses 8-13, wherein the at least one processor is further programmed or configured to: send the inference request to the at least one CPU if a throughput is less than a threshold; send the inference request to the at least one GPU if the at least one GPU is accumulating inference jobs and the inference request can fit into a batch based on the measured characteristics; send the inference request to the at least one CPU if the at least one GPU is unavailable to process the at least one model; or create a new job for the at least one GPU.

Clause 15: A computer program product, comprising at least one non-transitory computer-readable medium including program instructions that, when executed by at least one processor, cause the at least one processor to: determine, based on an inference request, at least one model to process the inference request on a plurality of computing platforms, the plurality of computing platforms including at least one Central Processing Unit (CPU) and at least one Graphics Processing Unit (GPU); obtain profile information of the at least one model, the profile information including measured characteristics of the at least one model; dynamically determine a selected computing platform from between the at least one CPU and the at least one GPU for responding to the inference request based on an optimized objective associated with a status of the computing platform and the profile information; and route the inference request to the selected computing platform.

Clause 16: The computer program product of clause 15, wherein the at least one non-transitory computer-readable medium includes further program instructions that, when executed by at least one processor, cause the at least one processor to determine the optimized objective by balancing throughput associated with processing the at least one model based on at least one of the following: a latency target, a power budget, a server node count, or any combination thereof.

Clause 17: The computer program product of clauses 15 or 16, wherein the profile information is obtained based on the at least one model and comprises a runtime deployment model trained for at least one of the plurality of computing platforms.

Clause 18: The computer program product of any of clauses 15-17, wherein the measured characteristics of the at least one model comprise at least one of the following: a throughput, a size, a power efficiency, an accuracy level, a model type, or any combination thereof.

Clause 19: The computer program product of any of clauses 15-18, wherein the status of the computing platform is determined based on at least one of the following: CPU utilization, GPU utilization, RAM utilization, inference throughput, number of jobs, latency data, historical completion data, CPU type, GPU type, a size of the at least one model, a memory footprint of the at least one model, or any combination thereof.

Clause 20: The computer program product of any of clauses 15-19, wherein the at least one non-transitory computer-readable medium includes further program instructions that, when executed by at least one processor, cause the at least one processor to: send the inference request to the at least one CPU if a throughput is less than a threshold; send the inference request to the at least one GPU if the at least one GPU is accumulating inference jobs and the inference request can fit into a batch based on the measured characteristics; send the inference request to the at least one CPU if the at least one GPU is unavailable to process the at least one model; or create a new job for the at least one GPU.

These and other features and characteristics of the presently disclosed subject matter, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosed subject matter. As used in the specification and the claims, the singular form of "a," "an," and "the" include plural referents unless the context clearly dictates otherwise.

BRIEF DESCRIPTION OF THE DRAWINGS

Additional advantages and details of the disclosed subject matter are explained in greater detail below with reference to the exemplary embodiments that are illustrated in the accompanying figures, in which.

DESCRIPTION

For purposes of the description hereinafter, the terms "end," "upper," "lower," "right," "left," "vertical," "horizontal," "top," "bottom," "lateral," "longitudinal," and derivatives thereof shall relate to the disclosed subject matter as it is oriented in the drawing figures. However, it is to be understood that the disclosed subject matter may assume various alternative variations and step sequences, except where expressly specified to the contrary. It is also to be understood that the specific devices and processes illustrated in the attached drawings, and described in the following specification, are simply exemplary embodiments or aspects of the disclosed subject matter. Hence, specific dimensions and other physical characteristics related to the embodiments or aspects disclosed herein are not to be considered as limiting unless otherwise indicated.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the term "communication" may refer to the reception, receipt, transmission, transfer, provision, and/or the like of data (e.g., information, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit processes information received from the first unit and communicates the processed information to the second unit.

As used herein, the term "computing device" may refer to one or more electronic devices configured to process data. A computing device may, in some examples, include the necessary components to receive, process, and output data, such as a processor, a display, a memory, an input device, a network interface, and/or the like. A computing device may be a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. A computing device may also be a desktop computer or other form of non-mobile computer.

As used herein, the term "server" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices (e.g., servers, point-of-sale (POS) devices, mobile devices, etc.) directly or indirectly communicating in the network environment may constitute a "system." Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

As used herein, the term "application programming interface" (API) may refer to computer code that allows communication between different systems or (hardware and/or software) components of systems. For example, an API may include function calls, functions, subroutines, communication protocols, fields, and/or the like usable and/or accessible by other systems or other (hardware and/or software) components of systems.

As used herein, the term "user interface" or "graphical user interface" refers to a generated display, such as one or more graphical user interfaces (GUIs) with which a user may interact, either directly or indirectly (e.g., through a keyboard, mouse, touchscreen, etc.).

As used herein, the term "issuer institution" may refer to one or more entities, such as a bank, that provide accounts to customers for conducting transactions (e.g., payment transactions), such as initiating credit and/or debit payments. For example, an issuer institution may provide an account identifier, such as a primary account number (PAN), to a customer that uniquely identifies one or more accounts associated with that customer. The account identifier may be embodied on a payment device, such as a physical financial instrument, e.g., a payment card, and/or may be electronic and used for electronic payments. The term "issuer system" refers to one or more computing devices operated by or on behalf of an issuer institution, such as a server computer executing one or more software applications. For example, an issuer system may include one or more authorization servers for authorizing a transaction.

As used herein, the term "acquirer institution" may refer to an entity licensed and/or approved by a transaction service provider to originate transactions (e.g., payment transactions) using a payment device associated with the transaction service provider. The transactions the acquirer institution may originate may include payment transactions (e.g., purchases, original credit transactions (OCTs), account funding transactions (AFTs), and/or the like). In some non-limiting embodiments, an acquirer institution may be a financial institution, such as a bank. As used herein, the term "acquirer system" may refer to one or more computing devices operated by or on behalf of an acquirer institution, such as a server computer executing one or more software applications.

As used herein, the term "payment device" may refer to a payment card (e.g., a credit or debit card), a gift card, a smartcard, smart media, a payroll card, a healthcare card, a wristband, a machine-readable medium containing account information, a keychain device or fob, an RFID transponder, a retailer discount or loyalty card, a cellular phone, an electronic wallet mobile application, a PDA, a pager, a security card, a computing device, an access card, a wireless terminal, a transponder, and/or the like. In some non-limiting embodiments, the payment device may include volatile or non-volatile memory to store information (e.g., an account identifier, a name of the account holder, and/or the like).

As used herein, the term "account identifier" may include one or more PANs, tokens, or other identifiers associated with a customer account. The term "token" may refer to an identifier that is used as a substitute or replacement identifier for an original account identifier, such as a PAN. Account identifiers may be alphanumeric or any combination of characters and/or symbols. Tokens may be associated with a PAN or other original account identifier in one or more data structures (e.g., one or more databases and/or the like) such that they may be used to conduct a transaction without directly using the original account identifier. In some examples, an original account identifier, such as a PAN, may be associated with a plurality of tokens for different individuals or purposes.

As used herein, the term "merchant" may refer to an individual or entity that provides goods and/or services, or access to goods and/or services, to customers based on a transaction, such as a payment transaction. As used herein, the terms "merchant" or "merchant system" may also refer to one or more computer systems operated by or on behalf of a merchant, such as a server computer executing one or more software applications. As used herein, the term "point-of-sale (POS) system," may refer to one or more computing devices and/or peripheral devices used by a merchant to engage in payment transactions with customers, including one or more card readers, near-field communication (NFC) receivers, RFID receivers, and/or other contactless transceivers or receivers, contact-based receivers, payment terminals, computers, servers, input devices, and/or other like devices that can be used to initiate a payment transaction. A POS system (e.g., a merchant POS system) may also include one or more server computers programmed or configured to process online payment transactions through webpages, mobile applications, and/or the like.

As used herein, the term "supervised learning" may refer to one or more machine learning algorithms that start with known input variables (x) and an output variable (y), and learn the mapping function from the input to the output. The goal of supervised learning is to approximate the mapping function so that predictions can be made about new input variables (x) that can be used to predict the output variables (y) for that data. The process of a supervised algorithm learning from the training dataset can be thought of as a teacher supervising the learning process. The correct answers are known. The algorithm iteratively makes predictions on the training data and is corrected by the teacher. Learning stops when the algorithm achieves an acceptable level of performance. Supervised learning problems can be further grouped into regression problems and classification problems. Supervised learning techniques can use labeled (e.g., classified) training data with normal and outlier data, but are not as reliable because of the lack of labeled outlier data. For example, multivariate probability distribution based systems are likely to score the data points with lower probabilities as outliers. A regression problem is when the output variable is a real value, such as "dollars" or "weight." A classification problem is when the output variable is a category, such as "red" and "blue," or "compliant" and "non-compliant".

As used herein, the term "unsupervised learning" may refer to one or more algorithms which have input variables (x) and no corresponding output variables. The goal for unsupervised learning is to model the underlying structure or distribution in the data in order to learn more about the data. Unlike supervised learning, in unsupervised learning there are no correct answers and there is no teacher. Unsupervised learning algorithms are used to discover and present the interesting structure in the data. Unsupervised learning problems can be further grouped into clustering and association problems. A clustering problem is modeling used to discover the inherent groupings in a dataset, such as grouping customers by purchasing behavior. An association rule learning problem is where you want to discover rules that describe large portions of data, such as people that buy A also tend to buy B. Some examples of unsupervised learning algorithms are clustering and likelihood modeling.

As used herein, the term "training" may refer to a process of analyzing training data to generate a model (e.g., create a machine learning algorithm, a prediction model, a classification model, a segmentation model, etc.). For example, a training server uses machine learning techniques to analyze the training data to generate the model, wherein the training data often includes numerous examples to generate a robust model for solving a problem across many variations which may be present in the data. In some non-limiting embodiments or aspects, generating the model (e.g., based on training data from a variety of sources) is referred to as "training the model." The machine learning techniques include, for example, supervised and/or unsupervised techniques, such as decision trees (e.g., gradient boosted decision trees), logistic regressions, artificial neural networks (e.g., convolutional neural networks), Bayesian statistics, learning automata, Hidden Markov Modeling, linear classifiers, quadratic classifiers, association rule learning, and/or the like. In some non-limiting embodiments or aspects, the model includes a prediction model that is specific to a particular geographic location, a particular merchant, a particular issuer, a particular acquirer, and/or the like. Additionally, or alternatively, the prediction model may be specific to a particular user (e.g., a customer of a merchant using a POS terminal, a customer using a reward system, an account examined for fraud, etc.). In some non-limiting embodiments or aspects, a training server generates one or more prediction models (e.g., one or more fraud detection models, one or more segmentations, etc.) for one or more operators of one or more accounts (e.g., one or more customer accounts, one or more merchant accounts, etc.), a particular group of customers, and/or the like.

In some non-limiting embodiments or aspects, a machine learning inference engine executes a model algorithm and returns an inference output. For example, an inference engine (e.g., inference server, etc.) may utilize one or more processing units (e.g., a CPU, GPU, tensor processing unit (TPU), field programmable gateway array (FPGA), an application-specific integrated circuit (ASIC), etc.) to execute the model algorithm. In existing systems, the processing choice is binary; either all CPU or all GPU. Therefore, a choice can have a significant impact on speed, throughput, latency, accuracy, rate of learning, and energy efficiency. As an example, GPUs are designed to provide high throughput for massively parallelizable workloads (e.g., thousands of cores). GPUs are well-suited for machine learning, such as deep neural nets which consist of a large number of operators, each working on some input (e.g., tensor(s), etc.) that can be divided into smaller workloads and carried out in parallel, typically resulting in lower latency. GPUs carry out computations in a very efficient and optimized way, so that they consume less power and generate less heat than when the same task is run on CPUs. However, GPUs have a low clock frequency, available random access memory (RAM) in the 10 GB range, and in certain circumstances, inferences on the GPU may not run fast enough to be suitable for real-time applications. CPUs have a high clock frequency, large amounts of RAM (e.g., in the 100 GB-10 TB range), and are typically fast to process individual inferences (e.g., individual inferences that are not parallelizable, etc.). GPUs may perform their computation with 16-bit or 32-bit floating point numbers and do not require quantization (e.g., a process of constraining, such as rounding an input from a continuous or otherwise large set of values (e.g., real numbers) to a discrete set (e.g., integers which may also reduce accuracy and/or precision due to the number and complexity of mathematical calculations) during deep network processing for optimal performance) unlike CPUs, however, GPUs may require expensive process-intensive quantization during storage to memory.

In non-limiting embodiments, a most effective computing platform may be advantageously determined before processing an inference request, providing control for dynamically selecting between different computing platforms by applying real-time status feedback with model limitations or capabilities relevant to speed, throughput, latency, accuracy, rate of learning, and/or energy efficiency based on the workload at hand. By determining a processor based on profile information and status feedback, advantages are gained to ensure that the computing platform being used provides the most efficient, accurate, and cost-effective performance with an increased speed for machine learning tasks. In some non-limiting embodiments or aspects, by taking cost, speed, and inference latency into consideration, bottlenecks in processing can be removed to provide considerable gains both from financial and time perspectives.

For the purpose of illustration, in the following description, while the presently disclosed subject matter is described with respect to methods, systems, and computer program products for dynamically determining and assigning an inference request, e.g., to a CPU or a GPU, one skilled in the art will recognize that the disclosed subject matter is not limited to the illustrative embodiments. For example, the methods, systems, and computer program products described herein may be used with a wide variety of settings, including dynamically assigning an inference request in any suitable setting, based on any suitable parameter, to maximize one or more of speed, throughput, latency, accuracy, rate of learning, energy efficiency, and/or the like.

Figure 1:
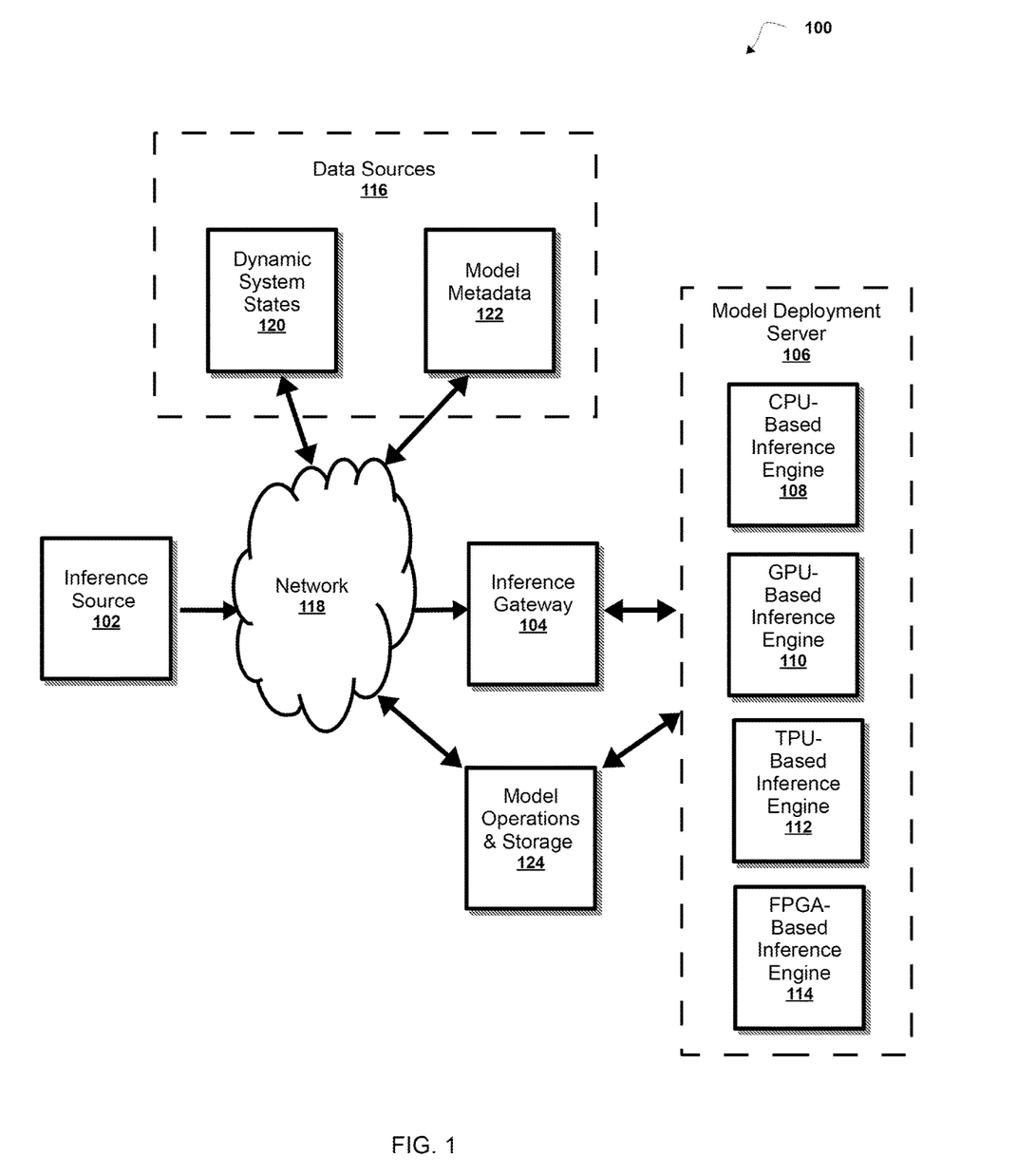
FIG. 1 is a diagram of a non-limiting embodiment of an environment in which methods, systems, and/or computer program products, described herein, may be implemented according to the principles of the presently disclosed subject matter.

Referring now to FIG. 1, FIG. 1 is a diagram of a non-limiting embodiment of an environment 100 in which systems, products, and/or methods, as described herein, may be implemented. As shown in FIG. 1, environment 100 includes inference source 102, inference gateway 104, model deployment server 106 (e.g., including one or more computing platforms, such as a CPU-Based Inference Engine 108, a GPU-Based Inference Engine 110, a TPU-Based Inference Engine 112, a FPGA-based Inference Engine 114, and/or the like), data sources 116, and network 118. The inference gateway 104, upon receiving an inference request from an inference source 102, determines a route to a model for the inference request based on dynamic system states 120 and static model metadata 122 relevant to one or more deployed models of the model deployment server 106. In some non-limiting embodiments or aspects, after a machine learning model is trained, it is then optimized and deployed for two or more specific runtime inference computing platforms of model deployment server 106 (e.g., a CPU-Based Inference Engine 108, GPU-Based Inference Engine 110, TPU-Based Inference Engine 112, and FPGA-based Inference Engine 114, etc.). For example, inference gateway 104 dynamically routes an inference request based on data sources 116. In some non-limiting embodiments or aspects, inference gateway 104 additionally, or alternatively, routes an inference request based on a static threshold, such as a configurable threshold based on a characteristic of a runtime environment of one or more computing platforms (e.g., a CPU-Based Inference Engine

108, GPU-Based Inference Engine 110, TPU-Based Inference Engine 112, and FPGA-based Inference Engine 114, etc.).

With continued reference to FIG. 1, inference source 102 includes one or more volumes of new data for forming an inference request to a trained model the volumes of new data may include records, standard transaction data, transaction dates, transaction times, supplier ID, transaction value, customer-defined reference number, purchase order number, tax amount, line-item details (e.g., purchased items, etc.), commercial data details (e.g., cardholder name, cardholder ID, merchant ID, or Merchant Category Code (MCC), lodging data, case data, car rental data, account balance data, and/or like forms of new data. In some non-limiting embodiments or aspects, an inference request refers to the process of taking a model that has already been trained (as above) and using that trained model to make useful predictions, or alternatively, any other characterizations based on or associated with the inference request.

Inference gateway 104 includes a gateway and a router. Inference gateway 104 receives inference requests from inference source 102 to invoke a model and routes the request to be processed by at least one of the model instances 106. Inference gateway 104 may be implemented in either software or hardware (e.g., ASIC or FPGA). Inference gateway 104 may include one or more interfaces to facilitate the exchange of inference requests from inference source 102, such as a user interface (e.g., a request from a client to invoke a model including new data to determine an inference, etc.) configured to facilitate a user to enter an inference request. Additionally, or alternatively, inference gateway 104 may include one or more application programming interfaces (API) for directly and uniformly inputting inference requests from disparate systems into the inference gateway 104.

In some non-limiting embodiments or aspects, an inference request may include transaction information comprising a restaurant purchase that may be used for determining a misuse of a credit card in a trained model. For example, a purchase of approximately $25-$50 may be common for a company and therefore scored low for all transactions having similar attributes, but larger amounts may be identified as fraudulent or misuse. By using a trained model to score an inference (e.g., to create a classification of an object, to label an inference request based on classification labels, etc.), instances of purchases deviating from the majority of the data may be determined to derive an inference (e.g., a classification, segmentation, etc.).

In some non-limiting embodiments or aspects, inference gateway 104 may include one or more software functions programmed to determine a route for the inference request. For example, inference gateway 104 may receive and analyze dynamic system states 120 (e.g., feedback of real-time processing unit metrics, etc.) and static model metadata 122 (e.g., a profile of each deployed model, etc.) to determine a deployed model to route the inference request based on an objective. In some non-limiting embodiments or aspects, the dynamic system states 120 and static model metadata 122 may be generated based on information captured in inference gateway 104 or model deployment server 106. For example, model deployment server 106 may include one or more software functions to analyze the model deployment as it is running in real-time. In addition, inference gateway 104 may include software functions for capturing data relevant to the inference request and deployment to one or more of the instance of model deployment server 106.

In some non-limiting embodiments or aspects, inference gateway 104 receives dynamic system states 120 that include feedback of real-time metrics related to processor utilizations for one or more CPUs, GPUs, or RAM, and in some examples, may include previously measured characteristics (e.g., static characteristics of a computing platform, processor, etc.). For example, at low volume/throughput (e.g., hundreds of transactions per second, etc.), running the model on CPU may yield lower latency as compared to GPU, while as the volume/throughput increases (e.g., thousands of transactions per second), running the same model on GPU may yield lower latency compared to the model running on a CPU. Further, dynamic system states 120 may include availability (e.g., reliability, etc.), response time (e.g., total time for response, etc.), processing speed, throughput (e.g., processing rate, etc.), power consumption, and/or the like which are relevant to a computing platform.

As already described, the static model metadata 122 may be a generated profile of each deployed model that can be used to determine a complexity of a model (e.g., data flow graph, neural network, etc.). In some non-limiting embodiments or aspects, a generated profile may include a first portion based on real-time information and a second portion based on historical data related to previous inference requests. In some non-limiting embodiments or aspects, static model metadata 122 includes constraints on performance that can be compared across models and platforms to dynamically distribute inference requests. In some non-limiting embodiments or aspects, after a machine learning model is trained, it may then be balanced for accuracy, latency, and/or performance to provide an optimized solution (e.g., optimized, etc.). A balanced model can be measured to determine profile information. For example, static model metadata 122 may be captured and stored for historical reference, or alternatively, measured in real-time while routing inference requests. Static model metadata 122 may include inference latency, the response time between receiving an inference request at an inference engine of model deployment server 106, and generating a response. Inference latency may be measured in seconds or fractions of a second. When a model latency is high, it may impact users. Further static model metadata 122 may include accuracy (e.g., identifying precision, including noise and other defects in the model, etc.), size (e.g., a number of layers, number nodes per layer, complexity of computations, node and layer connections, etc.), compute demand, throughput (e.g., the number of inferences that can be delivered given the size of the deep learning network created or deployed, etc.), energy efficiency (e.g., power consumption in inferences-per-watt, etc.), and rate of learning (e.g., a historical increase in the rate of learning, reduced deep learning times, etc.). In some non-limiting embodiments or aspects, size may include a size of a created model, or alternatively a deployed model, and may be proportional to the amount of computer and physical networking resources needed to run inferences. In another example, latency limit may ensure successful customer experience, however maximizing throughput within that latency limit is critical to maximizing an overall datacenter efficiency.

In some non-limiting embodiments or aspects, inference gateway 104 determines and/or routes an inference request to one or more of a CPU-bound processor, a GPU-bound processor, a TPU-bound processor, an FPGA, or an ASIC with the objective to balance system throughput and latency. In some non-limiting embodiments or aspects, inference gateway 104 is programmed or configured to dynamically assign an inference request to an inference engine. For example, inference gateway 104 receives feedback from the data sources 116 and/or model deployment server 106 relevant to one or more processing units (e.g., a CPU-bound processor, a GPU-bound processor, a TPU-bound processor, an FPGA, or an ASIC), and routes an inference request while also balancing a model throughput and/or latency. In such an example, and as described above, throughput defines how many inferences can be delivered by a model on a particular processing unit given the size of the model (e.g., a neural network, a deep learning network, etc.), either as created and/or deployed. Inference gateway 104 then determines a route for the inference request within a specified latency threshold (e.g., 2 seconds, determined based on the particular model, etc.), such that the latency limit ensures positive customer experience and maximizes throughput within that limit is critical to maximizing the efficiency of model deployment server 106 (e.g., a datacenter, etc.). In this way, in some non-limiting embodiments or aspects, environment 100 can deliver adequate throughput within a specified latency requirement, a power budget, or a server node count, and further, the resulting balance of throughput and latency can provide enhanced customer service, better service level agreements (SLAs), and more reliable and accurate reporting of machine learning services.

In some non-limiting embodiments or aspects, inference gateway 104 is programmed or configured to statically assign an inference request to an inference engine. For example, inference gateway 104 includes a software function to statically assign an inference request to a processing unit when a threshold is satisfied. As an example, inference gateway 104 may be programmed or configured to route an inference request to a CPU-bound model if a throughput is less than 300 transactions per second (TPS), and alternatively, if a throughput is equal or greater than 300 TPS, may invoke a GPU-bound graph. In some non-limiting embodiments or aspects, a threshold is a configurable parameter.

In some non-limiting embodiments or aspects, inference gateway 104 is programmed or configured to provide a combined ability to dynamically and statically assign an inference request to an inference engine. For example, inference gateway 104 includes a configurable static assignment which is used as a baseline (e.g., if throughput is less than 300 TPS, then invoke CPU-based model (graph), if throughput is equal or greater than 300 TPS, then invoke GPU-based model (graph), etc.). In such an example, the static assignment may be dynamically modified based on the feedback from the CPU and the GPU. In some non-limiting embodiments or aspects, there could be high CPU utilization due to additional intensive processing work (e.g., marshalling/un-marshalling of data, retrieval of information from cache, storing the state, etc.) even as the throughput remains low. In such an example, inference gateway 104 may dynamically shift an inference to a GPU-bound model that maximizes an objective, such as an overall increased performance (e.g., lower overall latency).

In some non-limiting embodiments or aspects, if a GPU-bound model is accumulating a batch and the inference request can fit into the batch, with consideration for the model memory and core usage footprint, then the request is routed to that GPU instance. In such an example, if no GPU instance is available to run the model, and there are CPU instances available, inference gateway 104 routes the request to an available CPU instance. If no GPU or CPU instance is available to run the model, inference gateway 104 starts and/or creates a new batch for the GPU instance. The GPU batch execution is triggered by either a time threshold or when the resources reserved by inference request models exceed the hardware capacity.

In some non-limiting embodiments or aspects, inference gateway 104 may communicate a deployment request to model operations & storage 124 which activates a software function to deploy a model. In such an example, model operations & storage 124 may include tools to export and import the model in a specific file format that the server understands. For instance, CPU-Based Inference Engine 108, GPU-Based Inference Engine 110, TPU-Based Inference Engine 112, and FPGA-based Inference Engine 114 may only understand models that are stored in a file format compatible with the type of processor (e.g., CPU, GPU, TPU, and FPGA). Model deployment server 106, or alternatively inference gateway 104, may include software functions on one or more devices capable of loading a CPU-Based Inference Engine 108, GPU-Based Inference Engine 110, TPU-Based Inference Engine 112, or FPGA-based Inference Engine 114.

In some non-limiting embodiments or aspects, network 118 may include one or more wired and/or wireless networks. For example, network 118 may include a cellular network (e.g., a long-term evolution (LTE) network, a third generation (3G) network, a fourth generation (4G) network, a fifth generation (5G) network, a code division multiple access (CDMA) network, and/or the like), a public land mobile network (PLMN), a local area network (LAN), a wide area network (WAN), a metropolitan area network (MAN), a telephone network (e.g., the public switched telephone network (PSTN)), a private network (e.g., a private network associated with a transaction service provider), an ad hoc network, an intranet, the Internet, a fiber optic-based network, a cloud computing network, and/or the like, and/or a combination of these or other types of networks.

The number and arrangement of systems, devices, and/or networks shown in FIG. 1 are provided as an example. There may be additional systems, devices, and/or networks, fewer systems, devices, and/or networks, different systems, devices, and/or networks, and/or differently arranged systems, devices, and/or networks than those shown in FIG. 1. Furthermore, two or more systems or devices shown in FIG. 1 may be implemented within a single system or device, or a single system or device shown in FIG. 1 may be implemented as multiple distributed systems or devices. Additionally or alternatively, a set of systems (e.g., one or more systems) or a set of devices (e.g., one or more devices) of environment 100 may perform one or more functions described as being performed by another set of systems or another set of devices of environment 100.

Figure 2:
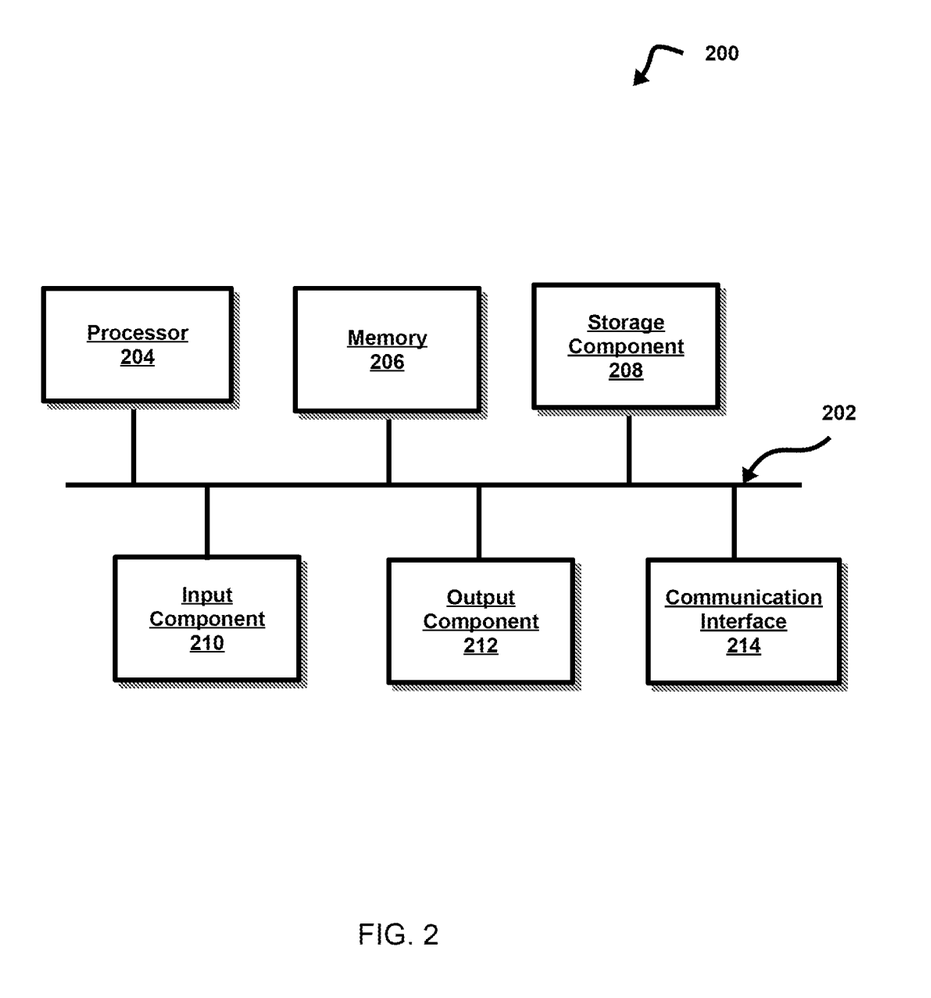
FIG. 2 is a diagram of a non-limiting embodiment of components of one or more devices of FIG. 1.

Referring now to FIG. 2, FIG. 2 is a diagram of example components of a device 200. Device 200 may correspond to one or more devices of inference source 102, one or more devices of inference gateway 104, one or more devices of model deployment server 106, one or more devices of CPU-Based Inference Engine 108, one or more devices of GPU-Based Inference Engine 110, one or more devices of TPU-Based Inference Engine 112, one or more devices of FPGA-based Inference Engine 114, one or more devices of data sources 116, and one or more devices of network 118. In some non-limiting embodiments or aspects, inference source 102, inference gateway 104, model deployment server 106, data sources 116, and network 118 may include at least one device 200 and/or at least one component of device 200. As shown in FIG. 2, device 200 may include bus 202, processor 204, memory 206, storage component 208, input component 210, output component 212, and communication interface 214.

Bus 202 may include a component that permits communication among the components of device 200. In some non-limiting embodiments or aspects, processor 204 may be implemented in hardware, software, or a combination of hardware and software. For example, processor 204 may include a processor (e.g., a central processing unit (CPU), a graphics processing unit (GPU), an accelerated processing unit (APU), and/or the like), a microprocessor, a digital signal processor (DSP), and/or any processing component (e.g., a field-programmable gate array (FPGA), an application-specific integrated circuit (ASIC), and/or the like), and/or the like, which can be programmed to perform a function. Memory 206 may include random access memory (RAM), read-only memory (ROM), and/or another type of dynamic or static storage device (e.g., flash memory, magnetic memory, optical memory, and/or the like) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touch screen display, a keyboard, a keypad, a mouse, a button, a switch, a microphone, a camera, and/or the like). Additionally or alternatively, input component 210 may include a sensor for sensing information (e.g., a global positioning system (GPS) component, an accelerometer, a gyroscope, an actuator, and/or the like). Output component 212 may include a component that provides output information from device 200 (e.g., a display, a speaker, one or more light-emitting diodes (LEDs), and/or the like).

Communication interface 214 may include a transceiver-like component (e.g., a transceiver, a receiver and transmitter that are separate, and/or the like) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a Bluetooth® interface, a Zigbee® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A non-transitory memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally or alternatively, hardwired circuitry may be used in place of or in combination with software instructions to perform one or more processes described herein. Thus, embodiments or aspects described herein are not limited to any specific combination of hardware circuitry and software.

The number and arrangement of components shown in FIG. 2 are provided as an example. In some non-limiting embodiments or aspects, device 200 may include additional components, fewer components, different components, or differently arranged components than those shown in FIG. 2. Additionally or alternatively, a set of components (e.g., one or more components) of device 200 may perform one or more functions described as being performed by another set of components of device 200.

Figure 3:
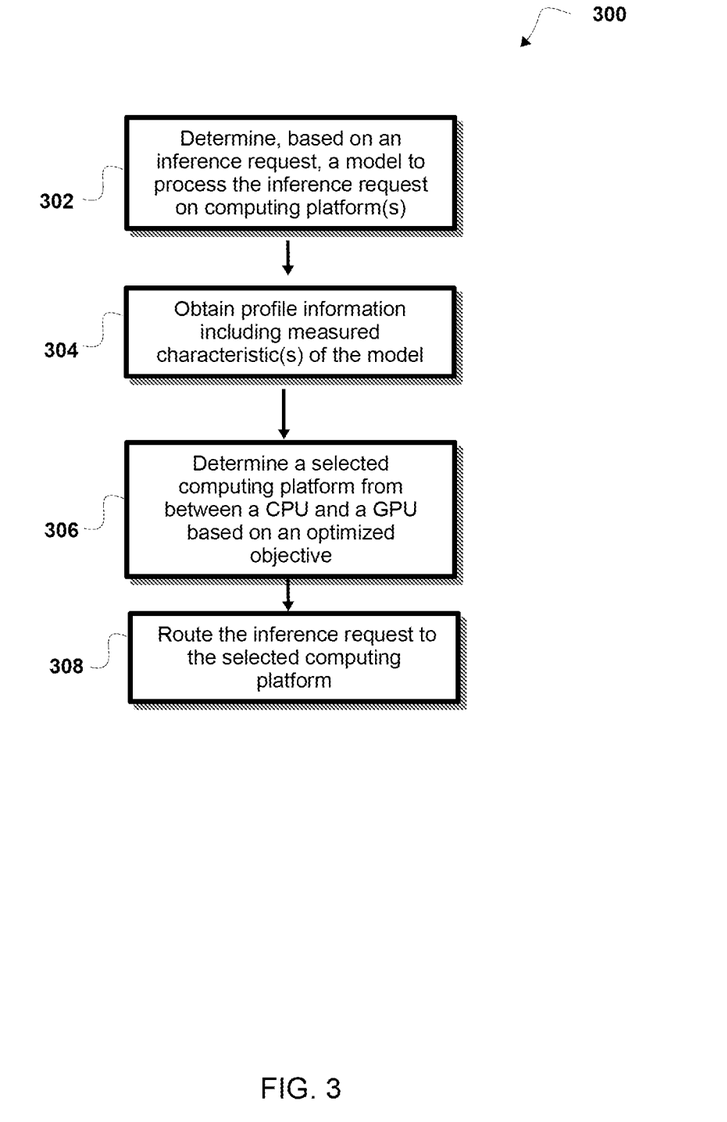
FIG. 3 is a step diagram of a method for dynamically assigning an inference request according to non-limiting embodiments or aspects.

Referring now to FIG. 3, FIG. 3 is a step diagram of a non-limiting embodiment of a process 300 for dynamically selecting a computing platform for an inference request. In some non-limiting embodiments or aspects, one or more of the steps of process 300 are performed (e.g., completely, partially, etc.) by inference gateway 104 (e.g., one or more devices of inference gateway 104) and/or model deployment server 106 (e.g., one or more devices of model deployment server 106). In some non-limiting embodiments, one or more of the steps of process 300 are performed (e.g., completely, partially, etc.) by another device or a group of devices separate from or including inference gateway 104 or model deployment server 106, such as, inference source 102 (e.g., one or more devices of inference source 102), and data sources 116.

As shown in FIG. 3, at step 302, process 300 includes determining, based on an inference request, a model to process inference requests on a plurality of computing platforms. For example, inference gateway 104 determines at least one model, based on an inference request, to process the inference request on a plurality of computing platforms, the plurality of computing platforms including at least one CPU and at least one GPU. In such an example, inference requests are loaded from inference source 102. Inference requests may be communicated directly from inference source 102 to inference gateway 104, such as, for example, from a user (e.g., a client) via a user interface, or alternatively, via an application programming interface. Inference requests may also be communicated indirectly, or partially indirectly, for example, by communicating, via a user interface or application programming interface, a model or a location of electronic data related to the inference request, such as an identification of a server (data sources 116, etc.), an identification of a file system (e.g., dynamic system states 120, static model metadata 122, etc.), and/or an identification of a filesystem (e.g., a path, etc.) of the inference request. In some non-limiting embodiments or aspects, a user may communicate a preferred processor unit (e.g., computing platform, computing device, etc.) for an inference request, a location of a model (e.g., model operations & storage 124, model deployment server 106, etc.), a priority level, or other processing information. In some non-limiting embodiments or aspects, an inference request may include a preferred model, an indication of a model, or inference data for determining a model to process the inference request.

As shown in FIG. 3, at step 304, process 300 includes obtaining profile information including measured characteristics of the at least one model. For example, an inference gateway 104 obtains profile information of the at least one model, including measured characteristics of the at least one model. Inference gateway 104 may obtain profile information from data sources 116 relevant to the model selected (e.g., determined, etc.) to process the inference request, the profile information based on the at least one model and including further information about a runtime deployment model trained for and/or operating on at least one of the plurality of computing platforms. The measured characteristics may include data which can be used for profiling the at least one model, and may be based on feedback generated during training of the model, or alternatively, based on one or more previously processed inference requests (e.g., historical data, completed requests, etc.). In some non-limiting embodiments or aspects, the measured characteristics of the at least one model includes a throughput, a size, a power efficiency, an accuracy level, a model type, availability, reliability, response time, processing speed, power consumption, and/or the like. The static model metadata 122 may be a dynamically generated profile at the runtime of each deployed model that can be used for an inference request, or, in other non-limiting embodiments or aspects, may be a static or partially static profile that has been previously generated, such as at the time of deployment, creation, or, alternatively, during a process of training of a model.

Still referring to FIG. 3, at step 306, process 300 includes determining a selected computing platform from between a CPU and a GPU based on an optimized objective. For example, inference gateway 104 dynamically determines a selected computing platform from between the at least one CPU and the at least one GPU for responding to the inference request based on an optimized objective associated with a status of the computing platform and the profile information. In such an example, the at least one model is loaded and operating on each computing platform, such as a CPU-bound model, a GPU-bound model, a TPU-bound model, an APU-bound model, an FPGA, an ASIC, and or the like. Inference gateway 104 may then dynamically determine one or more platforms by determining the optimized objective based on balancing throughput associated with processing the at least one model with at least one of a latency target, a power budget, a server node count, and/or the like. In one non-limiting embodiment or aspect, the at least one GPU or, in other non-limiting embodiments or aspects, other processor-bound models, may be configured to remain in a blocking state and receive batch jobs until a job size is maximized to start inferences. Inference gateway 104 may determine an optimized objective associated with a status of the computing platform and the profile information based on a status of the computing platform including at least one of the following: CPU utilization, GPU utilization, RAM utilization, inference throughput, number of jobs, latency data, historical completion data, CPU type, GPU type, a size of the at least one model, a memory footprint of the at least one model, and/or the like.

In some non-limiting embodiments or aspects, inference gateway 104 sends the inference request to the at least one CPU if a throughput is less than a threshold. In such an example, the threshold can be configured to a lowest acceptable performance of a machine learning model and may be further configured based on a type of dataset indicated by an inference request. In some non-limiting embodiments or aspects, inference gateway 104 sends the inference request to the at least one GPU if the at least one GPU is accumulating inference jobs and the inference request can fit into the batch based on the measured characteristics. In some non-limiting embodiments or aspects, inference gateway 104 sends the inference request to the at least one CPU if the at least one GPU is unavailable to process the at least one model. In some non-limiting embodiments or aspects, inference gateway 104 creates a new job for the at least one inference request, such as, for example, creating a new job for a GPU-bound model or, in other examples, one or more other processor-bound models.

As shown in FIG. 3, at step 308, process 300 includes routing the inference request to the selected computing platform. For example, inference gateway 104 routes the inference request to the selected computing platform. In some non-limiting embodiments or aspects, inference gateway 104, before routing an inference request to the selected computing platform, may invoke a deployment of a model for the selected computing platform (e.g., create an executable network from a network object associated with one or more single processor-bound models, etc.). Inference gateway 104 may communicate a deployment request to model operations & storage 124 and/or model deployment server 106, which activates a software function to deploy a model on model deployment server 106 (e.g., a processor-based inference engine, etc.). It will be appreciated that other methods of deploying a model may be used.

In some non-limiting embodiments or aspects, inference gateway 104 routes (e.g., communicates, sends, etc.) an inference request with an indication of a model and platform to one or more processor-based inference engines indirectly via model deployment server 106, or in other examples, directly to a processor-based inference engine. Based on the inference request, either model deployment server 106 or the processor-based inference engine (e.g., a CPU-Based Inference Engine 108, GPU-Based Inference Engine 110, TPU-Based Inference Engine 112, and FPGA-Based Inference Engine 114, etc.) may receive and process the inference request. Based on the inference request, inference request input and output may be configured (e.g., request additional input and output information, configure input and output layout information, configure the model memory based on input and output information, etc.) and the inference request may be loaded to the model. The processor-based inference engine may then prepare and input the inference request input to the model to perform an inference (e.g., as an input dataset, or as input from output of another model, cascade, etc.). In some non-limiting embodiments or aspects, measured characteristics are captured as the model processes the inference request. In some non-limiting embodiments or aspects, a model may be blocked until a timeout has elapsed or a result becomes available. In some non-limiting embodiments or aspects, the output may be processed and returned to a user, such as a user identified by an inference request, or, in other non-limiting embodiments or aspects, returned to the inference request gateway 104.

Figure 4:
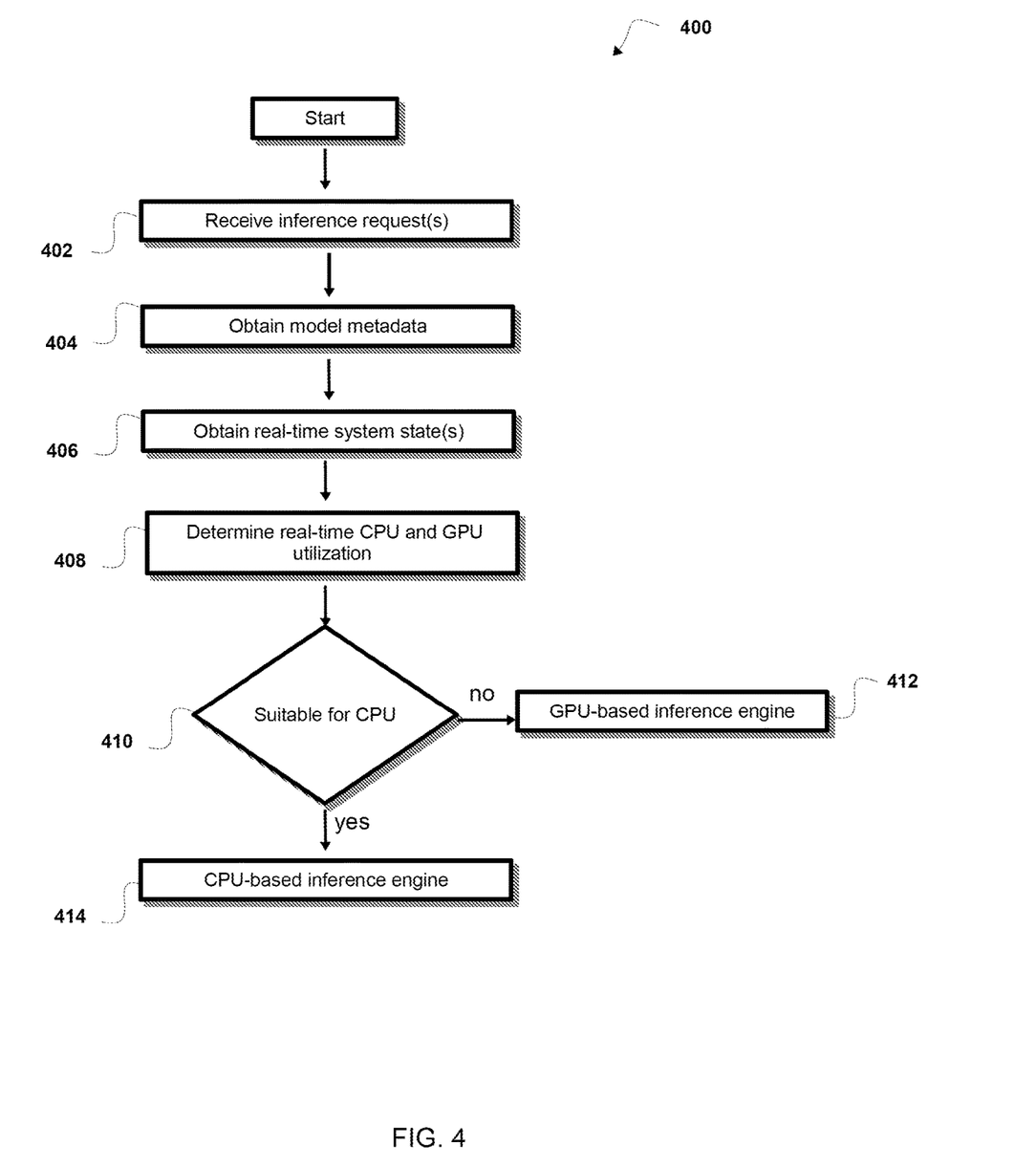
FIG. 4 is a step diagram of a method for dynamically assigning an inference request according to non-limiting embodiments or aspects.

Referring now to FIG. 4, FIG. 4 is a step diagram of a non-limiting embodiment of a process 400 for dynamically selecting a computing platform for an inference request. In some non-limiting embodiments or aspects, one or more of the steps of process 400 are performed (e.g., completely, partially, etc.) by inference gateway 104 (e.g., one or more devices of inference gateway 104) and/or by model deployment server 106 (e.g., one or more devices of model deployment server 106). In some non-limiting embodiments, one or more of the steps of process 400 are performed (e.g., completely, partially, etc.) by another device or a group of devices separate from or including inference gateway 104 or model deployment server 106, such as, inference source 102 (e.g., one or more devices of inference source 102), and data sources 116. It is envisioned that any such processing-bound model can be used to process inference requests based on a suitability in relation to one or more other candidate processing-bound models.

As shown in FIG. 4, at step 402, process 400 includes receiving one or more requests for one or more respective inferences. The requests may be received through one or more interfaces that facilitate input and identification of inference input (e.g., data sources, etc.). At step 404, model metadata may be obtained, for example, after determining one or more models suitable for processing the inference request. Next, real-time system states are obtained, at step 406, by activating a software function to determine a state of a processor-bound model among a plurality of processor-bound models. At step 408, a real-time CPU and GPU utilization are determined, and at 410, the system distributes the inference request based on a suitable inference engine to a suitable CPU-based inference engine at step 414, or, alternatively, to a GPU-based inference engine 412 or any other suitable processor-bound inference engine.

In some non-limiting embodiments or aspects, a GPU-bound model is suitable if accumulating a batch and the inference request can fit into the batch, with consideration for the model memory and core usage footprint. In another non-limiting embodiment or aspect, a CPU may be suitable if no GPU instance is available to run the model and there are CPU instances available. In a further example, if no GPU or CPU instances are available to run the model, a GPU may be suitable if a new batch for the GPU instance can be created or started. In some non-limiting embodiments or aspects, a GPU-bound model is suitable based on a threshold latency or throughput. In some non-limiting embodiments or aspects, a CPU-bound model is suitable based on a threshold latency or throughput.

Although the disclosed subject matter has been described in detail for the purpose of illustration based on what is currently considered to be the most practical and preferred embodiments or aspects, it is to be understood that such detail is solely for that purpose and that the disclosed subject matter is not limited to the disclosed embodiments or aspects, but, on the contrary, is intended to cover modifications and equivalent arrangements that are within the spirit and scope of the appended claims. For example, it is to be understood that the presently disclosed subject matter contemplates that, to the extent possible, one or more features of any embodiment can be combined with one or more features of any other embodiment.

What is claimed is:

1. A computer-implemented method, comprising:
   determining, with at least one processor, an objective function configured to reduce power consumption while providing a level of throughput within a power budget;
   statically assigning an inference request for processing based on a predefined latency threshold;
   determining, with at least one processor based on a platform status, at least one capability of a current state of a plurality of computing platforms;
   determining, with at least one processor based on profile information, at least one measured characteristic of at least one inference model;
   dynamically shifting, with at least one processor, the inference request to a selected graphics processing unit (GPU) bound inference model for processing by at least one of the plurality of computing platforms that maximizes the objective function based on the at least one capability of the current state of the plurality of computing platforms and a measured latency in the at least one inference model;
   routing, with at least one processor, the inference request to the selected GPU bound inference model; and
   processing the inference request by the selected GPU bound inference model.

2. The method of claim 1, further comprising:
   determining, with at least one processor, profile information including the at least one measured characteristic including at least one characteristic for predicting specific requirements and/or capabilities of the at least one inference model; and
   determining, with at least one processor based on the inference request, the at least one inference model to calculate the inference request on the plurality of computing platforms.

3. The method of claim 2, wherein the platform status includes real-time feedback including information to determine an availability, workload, and/or efficiency for processing the at least one inference model on at least one computing platform of the plurality of computing platforms, wherein the real-time feedback includes at least one capability of the plurality of computing platforms, including at least one of: a processor utilization, a memory utilization, an inference throughput, a response time, a processor speed, a power consumption, a model central processing unit (CPU) utilization, a model GPU utilization, a model RAM utilization, a model inference throughput, a model latency, a current state or any combination thereof; and
   wherein the profile information includes the at least one characteristic including at least one of: a size, a power efficiency, an accuracy level, a throughput of the at least one inference model, a current capacity, a bottleneck, a suitability for the inference request, a number of nodes, historical model latency data, historical completion data, or any combination thereof.

4. The method of claim 3, wherein maximizing the objective function, further comprises:
   determining real-time feedback and profile information for selecting the at least one inference model based on the current state and capabilities of the plurality of computing platforms and the at least one measured characteristic of the at least one inference model.

5. The method of claim 1, further comprising:
   determining the objective function based on a real-time latency in the at least one inference model; and
   generating a dynamic assignment of the inference request to a central processing unit (CPU)-bound inference model when a throughput is less than a threshold number of transactions over a predetermined period of time.

6. The method of claim 1, further comprising:
   determining an availability, a workload, and/or an efficiency of the plurality of computing platforms at a specified time based on real-time feedback; and
   determining a current capacity, bottleneck, and/or suitability for processing the inference request by the at least one inference model.

7. The method of claim 1, further comprising:
   obtaining, with at least one processor, profile information of the at least one inference model, the profile information including the at least one measured characteristic of the at least one inference model; and
   determining, with at least one processor, the platform status, wherein the platform status includes platform information associated with a current state of the plurality of computing platforms.

8. A system, comprising:
at least one processor configured to:
determine an objective function configured to reduce power consumption while providing a level of throughput within a power budget;
statically assign an inference request for processing based on a predefined latency threshold;
determine, based on a platform status, at least one capability of a current state of a plurality of computing platforms;
determine, based on profile information, at least one measured characteristic of at least one inference model;
dynamically shift the inference request to a selected graphics processing unit (GPU) bound inference model for processing by at least one of the plurality of computing platforms that maximizes the objective function based on the at least one capability of the current state of the plurality of computing platforms and a measured latency in the at least one inference model;
route the inference request to the selected GPU bound inference model; and
processing the inference request by the selected GPU bound inference model.

9. The system of claim 8, wherein the at least one processor is further configured to:
determine profile information including the at least one measured characteristic including at least one characteristic for predicting specific requirements and/or capabilities of the at least one inference model; and
determine, based on the inference request, the at least one inference model to calculate the inference request on the plurality of computing platforms.

10. The system of claim 9, wherein the platform status includes real-time feedback including information to determine an availability, workload, and/or efficiency for processing the at least one inference model on at least one computing platform of the plurality of computing platforms, wherein the real-time feedback includes at least one capability of the plurality of computing platforms, including at least one of: a processor utilization, a memory utilization, an inference throughput, a response time, a processor speed, a power consumption, a model central processing unit (CPU) utilization, a model GPU utilization, a model RAM utilization, a model inference throughput, a model latency, a current state or any combination thereof; and
wherein the profile information includes the at least one characteristic including at least one of: a size, a power efficiency, an accuracy level, a throughput of the at least one inference model, a current capacity, a bottleneck, a suitability for the inference request, a number of nodes, historical model latency data, historical completion data, or any combination thereof.

11. The system of claim 10, wherein the at least one processor is further configured to maximize the objective function by:
determining real-time feedback and profile information for selecting the at least one inference model based on the current state and capabilities of the plurality of computing platforms and the at least one measured characteristic of the at least one inference model.

12. The system of claim 8, wherein the at least one processor is further configured to:
determine the objective function based on a real-time latency in the at least one inference model; and
generate a dynamic assignment of the inference request to a central processing unit (CPU)-bound inference model when a throughput is less than a threshold number of transactions over a predetermined period of time.

13. The system of claim 8, wherein the at least one processor is further configured to:
determine an availability, a workload, and/or an efficiency of the plurality of computing platforms at a specified time based on real-time feedback; and
determine a current capacity, bottleneck, and/or suitability for processing the inference request by the at least one inference model.

14. The system of claim 8, wherein the at least one processor is further configured to:
obtain profile information of the at least one inference model, the profile information including the at least one measured characteristic of the at least one inference model; and
determine the platform status, wherein the platform status includes platform information associated with a current state of the plurality of computing platforms.

15. A computer program product comprising at least one non-transitory computer-readable medium including one or more instructions that, when executed by at least one processor, cause at least one processor to:
determine an objective function configured to reduce power consumption while providing a level of throughput within a power budget;
statically assign an inference request for processing based on a predefined latency threshold;
determine, based on a platform status, at least one capability of a current state of a plurality of computing platforms;
determine, based on profile information, at least one measured characteristic of at least one inference model;
dynamically shift the inference request to a selected graphics processing unit (GPU) bound inference model for processing by at least one of the plurality of computing platforms that maximizes the objective function based on the at least one capability of the current state of the plurality of computing platforms and a measured latency in the at least one inference model;
route the inference request to the selected GPU bound inference model; and
processing the inference request by the selected GPU bound inference model.

16. The computer program product of claim 15, wherein the one or more instructions further cause the at least one processor to:
determine profile information including the at least one measured characteristic including at least one characteristic for predicting specific requirements and/or capabilities of the at least one inference model; and
determine, based on the inference request, the at least one inference model to calculate the inference request on the plurality of computing platforms.

17. The computer program product of claim 16, wherein the platform status includes real-time feedback including information to determine an availability, workload, and/or efficiency for processing the at least one inference model on at least one computing platform of the plurality of computing platforms, wherein the real-time feedback includes at least one capability of the plurality of computing platforms, including at least one of: a processor utilization, a memory utilization, an inference throughput, a response time, a processor speed, a power consumption, a model central processing unit (CPU) utilization, a model GPU utilization, a model RAM utilization, a model inference throughput, a model latency, a current state or any combination thereof; and wherein the profile information includes the at least one characteristic including at least one of: a size, a power efficiency, an accuracy level, a throughput of the at least one inference model, a current capacity, a bottleneck, a suitability for the inference request, a number of nodes, historical model latency data, historical completion data, or any combination thereof.

18. The computer program product of claim 17, wherein the one or more instructions further cause the at least one processor to maximize the objective function by:

determining real-time feedback and profile information for selecting the at least one inference model based on the current state and capabilities of the plurality of computing platforms and the at least one measured characteristic of the at least one inference model.

19. The computer program product of claim 15, wherein the one or more instructions further cause the at least one processor to:

determine the objective function based on a real-time latency in the at least one inference model; and generate a dynamic assignment of the inference request to a central processing unit (CPU)-bound inference model when a throughput is less than a threshold number of transactions over a predetermined period of time.

20. The computer program product of claim 15, wherein the one or more instructions further cause the at least one processor to:

determine the platform status, wherein the platform status includes platform information associated with a current state of the plurality of computing platforms;

determine an availability, a workload, and/or an efficiency of the plurality of computing platforms at a specified time based on real-time feedback; and determine a current capacity, bottleneck, and/or suitability for processing the inference request by the at least one inference model.

* * * * *